(12) United States Patent
Linder (10) Patent No.: US 6,236,198 B1
(45) Date of Patent: May 22, 2001

(54) METHOD AND DEVICE FOR NON-CONTACT MEASUREMENT OF ELECTRICALLY CONDUCTIVE MATERIAL

(75) Inventor: Sten Linder, Västerås (SE)

(73) Assignee: Asea Brown Boveri AB, Vasteras (SE)

( * ) Notice: Subject to any disclaimer, the term of this patent is extended or adjusted under 35 U.S.C. 154(b) by 0 days.

(21) Appl. No.: 09/051,333

(22) PCT Filed: Sep. 27, 1996

(86) PCT No.: PCT/SE96/01207

§ 371 Date: May 28, 1998

§ 102(e) Date: May 28, 1998

(87) PCT Pub. No.: WO97/14013

PCT Pub. Date: Apr. 17, 1997

(30) Foreign Application Priority Data

Oct. 13, 1995 (SE) .................................................. 9503583

(51) Int. Cl.$^7$ ................................. G01B 7/02; G01B 7/14
(52) U.S. Cl. .................... 324/207.17; 324/229; 324/232; 324/239; 324/243
(58) Field of Search ......................... 324/207.17–207.19, 324/207.26, 228–232, 239–243, 343

(56) References Cited

U.S. PATENT DOCUMENTS

| | | | |
|---|---|---|---|
| 3,539,911 | * 11/1970 | Youmans et al. | 324/343 |
| 3,693,075 | * 9/1972 | Forster | 324/241 X |
| 4,475,083 | 10/1984 | Linder | 324/227 |
| 4,591,785 | * 5/1986 | Hoehn, Jr. | 324/239 |
| 4,686,471 | * 8/1987 | Morita et al. | 324/243 |
| 4,950,986 | * 8/1990 | Guerrero | 324/207.26 X |
| 5,059,902 | 10/1991 | Linder | 324/207.17 |
| 5,270,646 | 12/1993 | Kihlberg et al. | 324/207.16 |
| 5,339,029 | 8/1994 | Wagner | 324/207.17 |
| 5,446,379 | * 8/1995 | Machi | 324/207.17 X |

FOREIGN PATENT DOCUMENTS

2158240 * 11/1985 (GB) ..................................... 324/329

OTHER PUBLICATIONS

Placko et al., Thickness touchless measurements using eddy current sensors, Electric Machines and Power Systems, vol. 17, 1989, pp. 125–137.

Mor et al., The Electromagnetic Field Distribution of the Rectangular Current Frame Placed at an Arbitrary Position above a Conducting Sheet, Journal of the Franklin Institute, pp. 621–640, The Franklin Institute 0016–0032/90 undated.

* cited by examiner

Primary Examiner—Gerard R. Strecker
(74) Attorney, Agent, or Firm—Connolly Bove Lodge & Hutz LLP (57) ABSTRACT

A method and a device for non-contacting measurement of the measures and position of objects of electrically conductive materials based on electromagnetic induction is provided. A measuring object, a transmitter coil and a receiver coil are placed in relation to each other such that a time-varying magnetic field generated by the transmitter coil at a measuring region of the measuring object is substantially parallel to the surface of the measuring region. The receiver coil is placed such that a conceived field line which touches the measuring region in its extension reaches the receiver coil. On the basis of the voltage induced in the receiver coil, the position and dimensions of the measuring region relative to a given reference point can be calculated.

10 Claims, 7 Drawing Sheets

METHOD AND DEVICE FOR NON-CONTACT MEASUREMENT OF ELECTRICALLY CONDUCTIVE MATERIAL

TECHNICAL FIELD

The present invention relates to a method and a device for non-contacting measurement of measures such as height, width, etc., and positions of objects of electrically conductive material based on electro-magnetic induction.

The invention may be used when manufacturing metal products such as tubes rods or beams, in which it is desired to measure the measures and positions of these products. The invention may also be used for measurement on products made of graphite, electrically conductive ceramic, or the like.

BACKGROUND OF THE INVENTION

One known method for non-contacting measurement of positions and various measures, such as height and width, of tubes, rods, beams or like products is to use optical methods based on shading or reflection of beams, or by processing of images taken by a video camera.

The environment in many manufacturing processes, involving, above all, pollution and often high temperatures, deteriorates the reliability and the accuracy of such equipment.

It is previously known to measure the measures and position of an electrically conductive measuring object by means of inductive methods. In that case, a transmitter coil is used which generates a time-varying magnetic field which induces currents in the conductive measuring object. These currents generate a magnetic field which, in turn, induces a voltage in a receiver coil, this voltage being dependent, among other things on the shape, the conductivity, and the magnetic permeability of the measuring object, as well as on the geometrical conditions. From this voltage, under certain conditions, geometrical dimensions, such as distances and the position of the measuring object, may be calculated. For generating a time-varying magnetic field, sinusoidal currents in the transmitter coil may be used, as described in U.S. Pat. No. 4,475,083, or a constant current which is suddenly interrupted, such as described in U.S. Pat. No. 5,059,902, may be used. The latter method is more robust from the point of view of a measurement technique and facilitates the separation of different properties of the measuring object. One problem with these measurement devices, however, is to determine the measures of the measuring object when its position is changed.

U.S. Pat. No. 5,270,646 discloses a method of arranging coils so as to achieve measurement of the width of a strip. However, the technique can only be used for a strip of relatively limited width. Further, it is assumed for correct function that the edge of the strip is substantially plane. For many applications, the accuracy is not sufficient, primarily when there are large distances between the strip and the measuring coils, which is due to difficulties in correctly compensating for variations in the distance.

Common to prior art devices for inductive measurement of distance, thickness and measures of electrically conductive objects, derived therefrom, is that the transmitter and receiver coils are arranged with the same symmetry axis or are located on different sides of the measuring object. It also occurs that the same coil is used as transmitter and receiver coil. The magnetic field generated by the transmitter coil then becomes substantially perpendicular to the surface of the measuring object at the measuring point, or at least has a large component towards the surface of the measuring object. This results in currents and magnetic fields from different depths into the measuring object contributing to the measurement signal which thus becomes both material-dependent and dependent on the thickness and shape of the measuring object in a relatively large region around the location where measurement is to take place.

SUMMARY OF THE INVENTION

Figure 1:
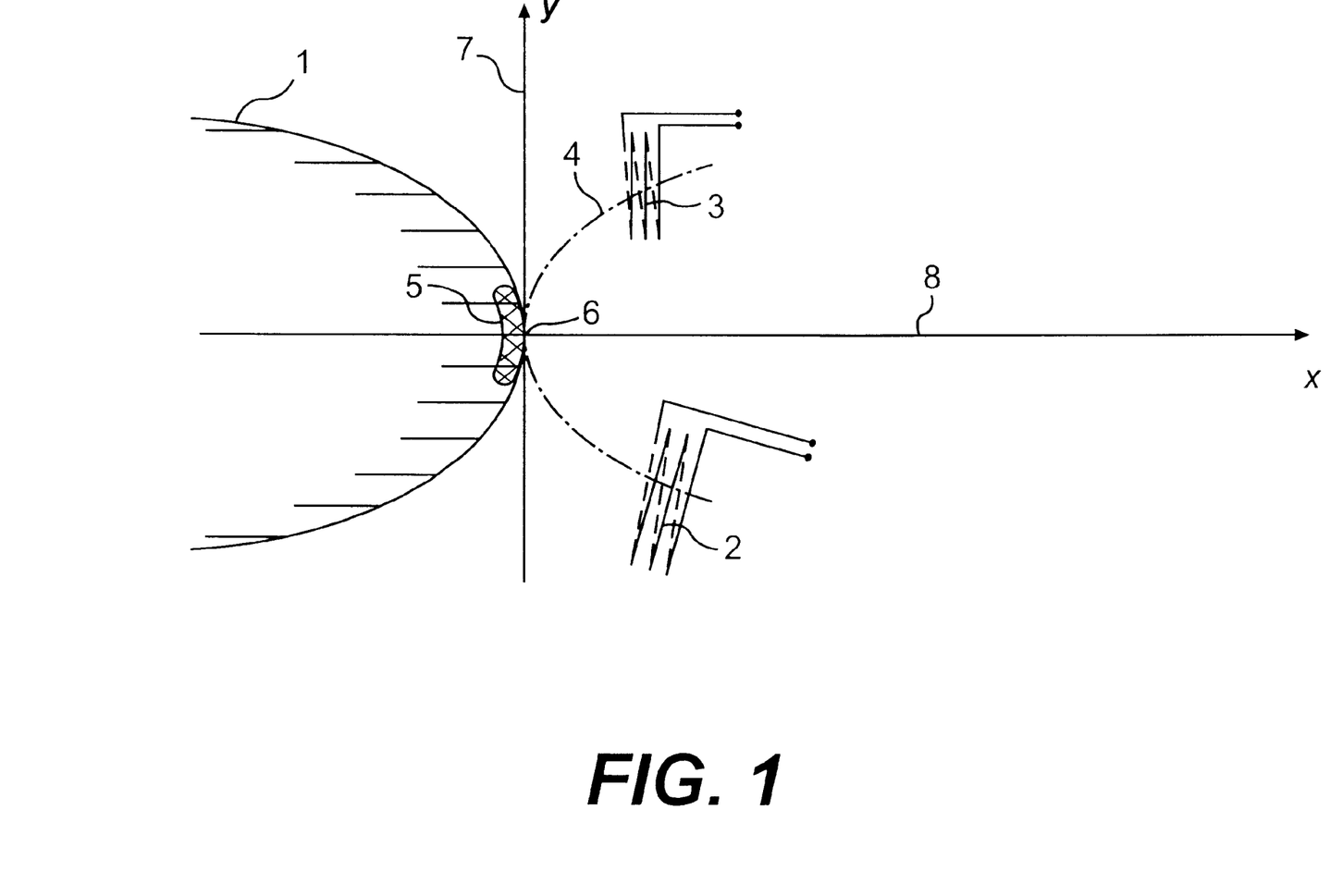
FIG. 1 shows the measuring principle according to the invention.

The invention is based, as shown in FIG. 1, on placing a measuring object 1, a transmitter coil 2, and a receiver coil 3 in relation to each other in such a way that magnetic field 4 generated by the transmitter coil at a measuring region 5, defined as the region around a conceived measuring point 6, is substantially parallel to the surface of the measuring object at the measuring region, or, for a measuring object with a curved surface, parallel to a tangential plane 7 at the measuring point 6. The measurement device then becomes most sensitive to movements in the direction of a line 8, indicated below as the x direction or the x line, perpendicular to the tangential plane at the measuring point. The receiver coil is to be located such that a conceived field line 4, which symbolizes the magnetic field, touches the measuring region and in its extension reaches the receiver coil. This is achieved by a substantially symmetrical location of the coils in relation to the measuring region in question and where the transmitter coil, the measuring region, and the receiver coil lie on one and the same circular arc and where the circular arc at the measuring region is curved outwardly. A more detailed definition of the location of the coils will be given in the appended figures and the following description of embodiments. The invention also functions in the case of a minor deviation from a location according to the above. Measurements with an arrangement of the coils according to the invention are sensitive to movement of the measuring object perpendicular to the magnetic field at the measuring region, that is, in the x direction, whereas the measurements are only influenced to a marginal extent by the movements of the measuring object in parallel with the magnetic field, indicated below as the y direction or the y line.

The currents which are induced in the measuring object because of the magnetic field which is parallel to the measuring region are concentrated at the measuring region. This means that the voltage which is induced in the receiver coil is substantially dependent on the magnetic field in the measuring region and the position of the receiver coil. In this connection, the shape of the measuring object and its position outside the measuring region will have a negligible influence on the result of the measurement.

A small change of the position of the measuring region in the x direction results in a linear change of the voltage induced in the receiver coil. On the other hand, the voltage induced in the receiver coil is stationary with respect to small changes of the position of the measuring region in the y direction. This means that the measurement signal is sensitive to small changes in position perpendicular to the surface of the measuring region but is influenced only to a marginal extent by small changes in position parallel to the measuring region. Changes in position perpendicular to the surface of the measuring object can thus be measured selectively.

U.S. Pat. No. 5,059,902 describes an advantageous method of supplying a transmitter coil. It describes supply with a constant current which has a sufficient duration for the magnetic field to be considered quasi-static. The magnetic field which is generated when this current is interrupted has the same shape as the quasi-stationary field, but the opposite direction. In this way, after interruption of the current, the field continues to be parallel to the measuring region. When supplying the primary coil with sinusoidal alternating current, the direction of the field at the measuring region varies during one period of the alternating voltage. For a correct measurement, the direction of the field at the measuring region must, on average, be parallel for one period, which is difficult to obtain.

The voltage induced in the receiver coil as a function of the time, after the constant current in the transmitter coil has been interrupted, comprises a short and a rapidly diminishing voltage pulse which is induced by the rapidly decreasing magnetic field in the air between the coils and the measuring object, and a considerably more slowly diminishing voltage pulse which relates to the magnetic field within the measuring object which decreases slowly because of the skin effect (current diffusion). The fast voltage pulse immediately after closing of the supply voltage of the transmitter coil is essentially independent of the electrical conductivity and the magnetic permeability of the measuring object and is substantially a function of the geometry of the magnetic field outside the measuring object and the resistance in the measuring circuit. The fast voltage signal is in practice independent of the material as long as its duration is short compared with the time for current diffusion in the measuring region. The induced voltage can be evaluated as a measure of the position of the measuring object relative to the coils. The position of the measuring region of the measuring object on a line perpendicular to its surface can then be calculated.

If a measurement is carried out with a corresponding set of a transmitter coil and a receiver coil for measuring the position of a measuring region of the measuring object with a measuring point on the extension of the x line through the measuring object and with a tangential plane parallel to the tangential plane 7, it is possible, by a combination of the results from the two measurements, to determine the length in the x direction between the two tangential planes. Both measurements can be made simultaneously or in rapid succession after each other.

To be able to measure a plurality of different measures of the measuring object, for example height and width, a plurality of associated transmitter and receiver coils according to the invention are placed around the measuring object. The supply current of the transmitter coils is then normally interrupted at different times in order for the measurements not to influence each other.

A measurement device according to the invention, when using a constant supply current through the transmitter coil which is interrupted after a time which is sufficient for creating a quasi-static magnetic field in the air, is within wide limits independent of the material properties of the measuring object, such as conductivity and permeability. The material properties would influence a similar inductive measurement with a sinusoidal alternating current. Since each coil system is only influenced by the surface of the measuring object within a small measuring range, independent of the shape of the whole measuring object, the invention can be easily adapted to a wide variety of measuring objects. The requirement for a magnetic field substantially parallel to the surface of the measuring object in the measuring region can be fulfilled in a plurality of different ways and thus allows great flexibility in the location of the coils.

DESCRIPTION OF THE PREFERRED EMBODIMENTS

Figure 2:
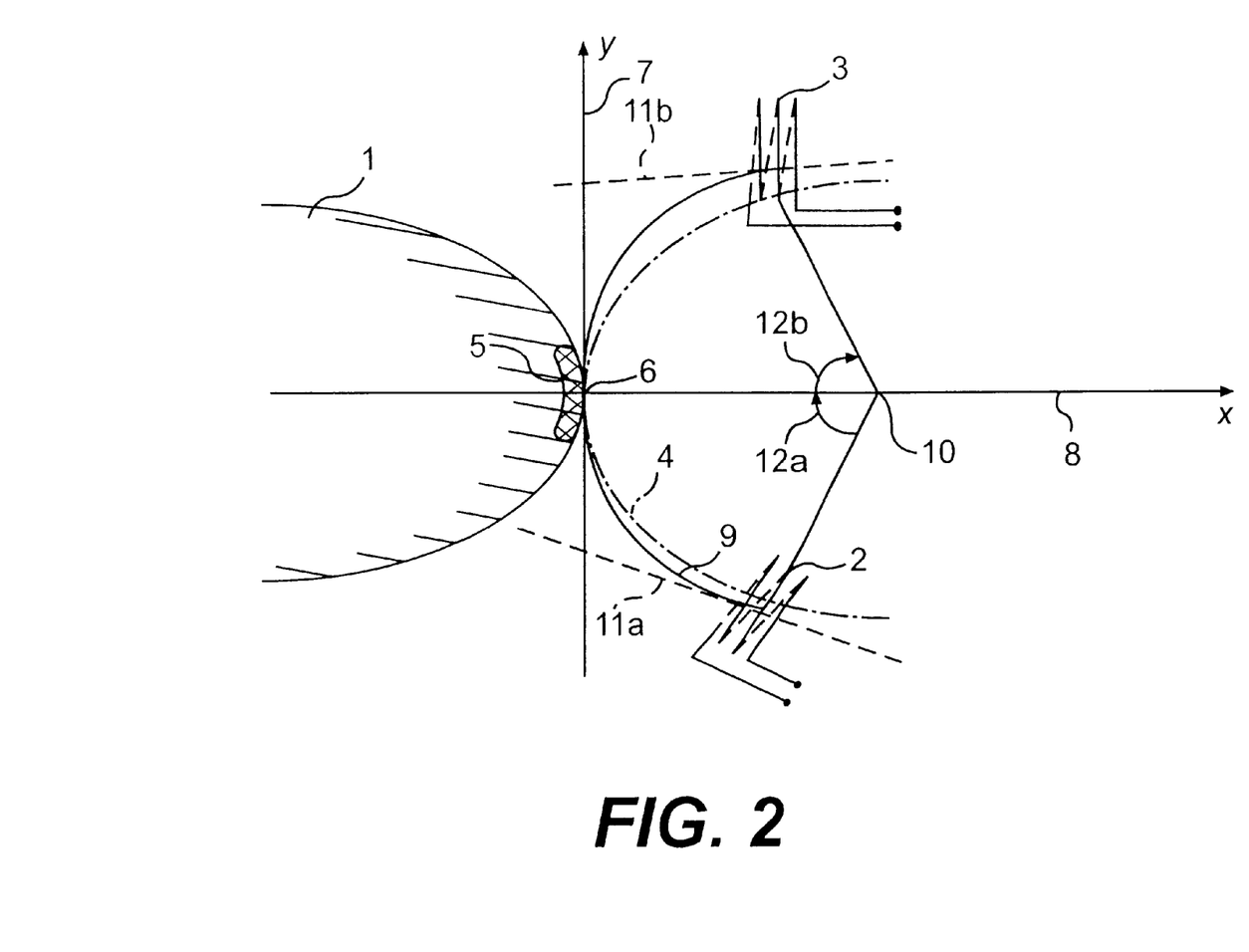
FIG. 2 is a sketch showing the principle of a measurement device according to the invention.

FIG. 2 is a sketch showing the principle of a measurement device for measuring the position of the measuring region according to the invention. It comprises a measuring object 1, a transmitter coil 2 and a receiver coil 3 which are arranged such that a conceived magnetic field line 4, which extends from the transmitter coil 2, touches the measuring region 5 and reaches the receiver coil 3. The field line represents the quasi-static magnetic field which is achieved after connection of supply to the transmitter coil with a constant current for a time which is long compared to the time for the diffusion of current and magnetic field in the measuring region. A measuring point 6 within the measuring region is touched by a tangential plane 7 in the y direction. The x line, mentioned in the summary of the invention, will be referred to below, for the reasons stated, as a symmetry line 8 perpendicular to the tangential plane at the measuring point. The transmitter coil 2 and the receiver coil 3 are placed substantially symmetrically on different sides of the measuring point in such a way that the coils and the measuring point substantially lie on one and the same circular arc 9 with a center 10 outside the measuring object on the symmetry line 8. The center of the circular arc is suitably selected as the origin of coordinates for distance measurements in the x direction, that is, along the symmetry line. The axial lines 11a and 11b of the coils through the coils are adjusted for an optimum measurement result. In a preferred orientation of the transmitter coil 2, the axial line 11a of the coil touches the arc 9. In a likewise preferred placement of the measuring object and the measuring region, the angle 12a between the symmetry line 8 and a line from the center 10 to the transmitter coil 2 is equal to the angle 12b between the symmetry line 8 and a line from the center 10 to the receiver coil 3.

The fact that a measurement device according to the invention is not particularly sensitive to deviations from the preferred location according to the above means that the device provides relevant measures of a change of the position of the measuring region if the change is smaller than 10–30% of the distance between the measuring region and any of the coils.

Figure 3:
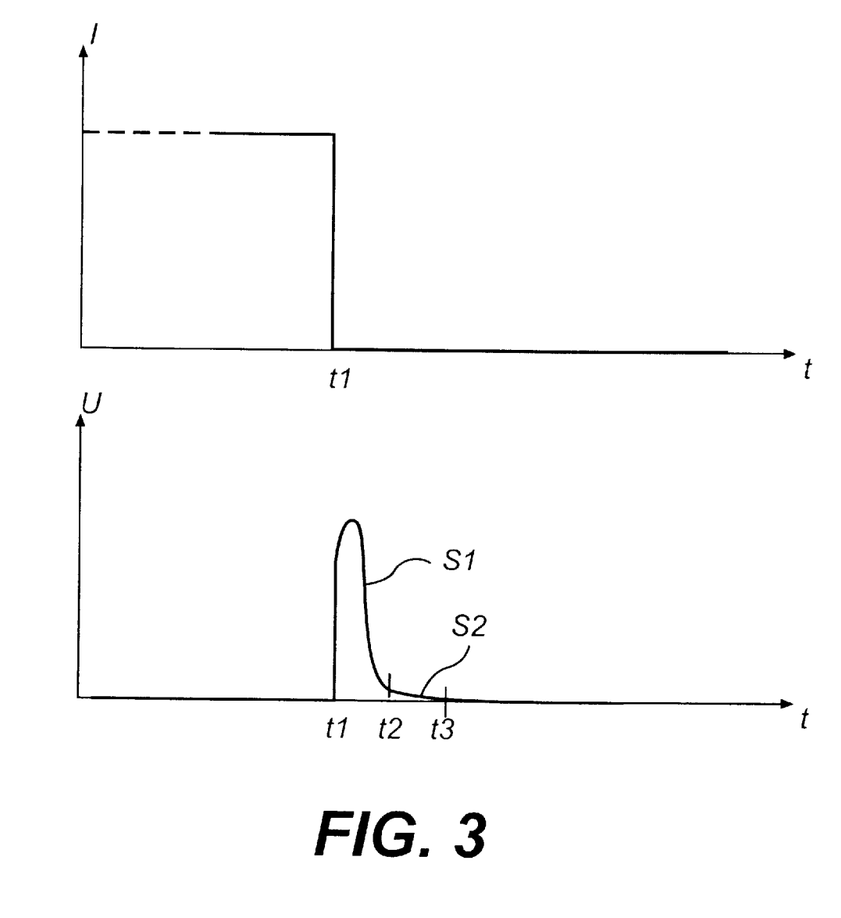
FIG. 3 shows the current through a transmitter coil and the induced voltage in a receiver coil for a measurement operation.

FIG. 3 schematically shows the current I in the transmitter coil and the voltage U, induced in the receiver coil, as a function of the time t. The current through the transmitter coil is constant till the time t1, where it is interrupted. The duration of the current has then been longer than the time of the penetration of the magnetic field into the material of the measuring object within the measuring region such that the magnetic field is quasi-static. After the current through the transmitter coil is interrupted, the decreasing magnetic field in the air around the measuring object induces a voltage pulse S1 in the receiver coil of a short duration between the times t1 and t2. Thereafter, the magnetic field, which diffuses out of the measuring object, induces a much smaller and more slowly decreasing voltage pulse S2. A measure of the x position of the measuring region on the symmetry line 8 according to FIG. 2, or the distance of the measuring region from a given reference point, for example the center 10 of the above-mentioned arc, can then be derived from a linear combination of the integral of the voltage pulse S1 between t1 and t2 and the integral of that part of the voltage pulse S2 which lies between t2 and t3 according to FIG. 2. The time t3 is preferably chosen such that t3−t2 is of the same order of magnitude as the time difference t2−t1. The linear combination M, which can thus provide a measure of the x position of the measuring object, can be expressed as $$M = a \cdot \int_{t1}^{t2} S1 \cdot dt + b \cdot \int_{t2}^{t3} S2 \cdot dt$$

where the coefficients a and b are chosen after calibration with measuring objects made of materials with different electrical conductivity such that the difference in M between the materials is as small as possible. If the time difference t3−t2 is chosen equal to 2(t2−t1), a and b will be substantially equal and no calibration according to the above need be made.

Figure 4:
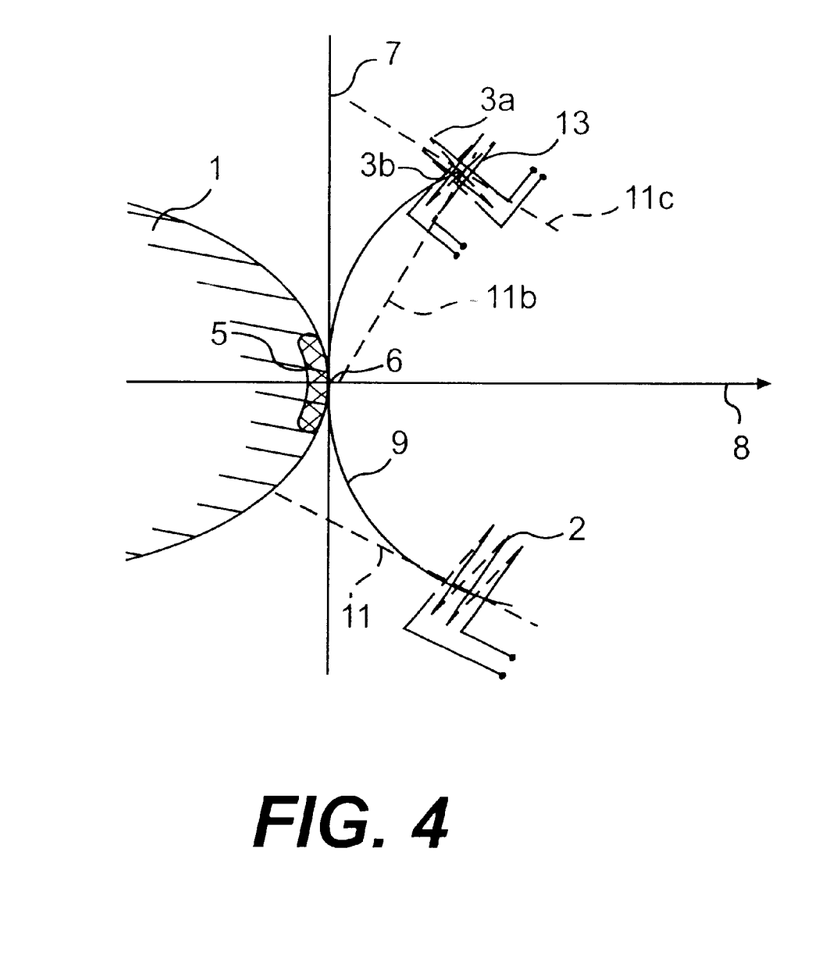
FIG. 4 shows a measurement device with two orthogonal receiver coils.

Instead of one receiver coil, in alternative embodiments, two receiver coils may be used. FIG. 4 shows two receiver coils 3a and 3b with a common center point 13 on the circular arc 9 and center lines 11b and 11c perpendicular to each other. In a preferred embodiment with two receiver coils, the center line of one coil shall be directed towards the measuring region. In FIG. 4 this is coil 3a with the center line 11b directed towards the measuring point. The relationship between the measurement signals from these two coils is, within wide limits, substantially only dependent on the position of the measuring region in the x direction.

Figure 5:
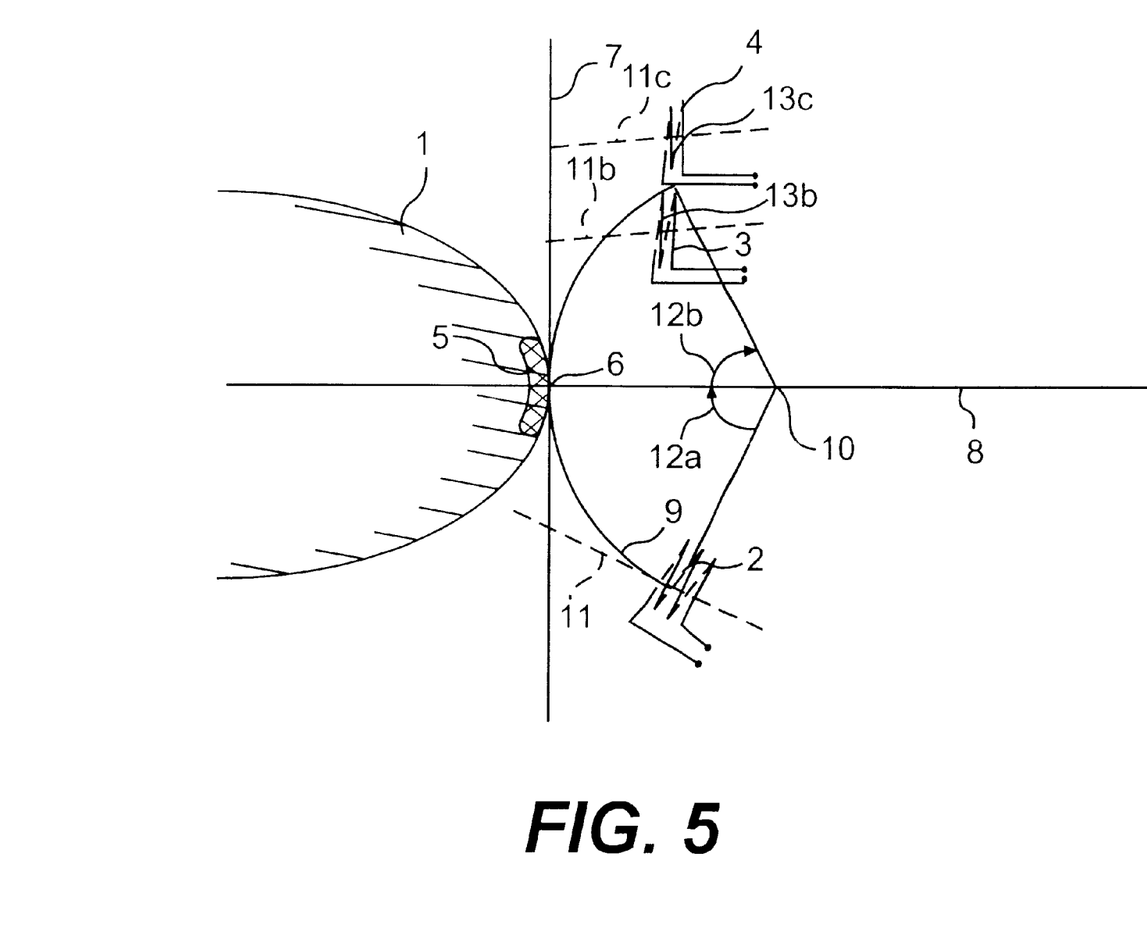
FIG. 5 shows a measurement device with two substantially parallel receiver coils.

An additional embodiment with two receiver coils 3 and 4 is shown in FIG. 5. The coils are here placed on different sides of the circular arc 9 and with substantially parallel center lines 11b and 11c parallel to the symmetry line 8.

Figure 6:
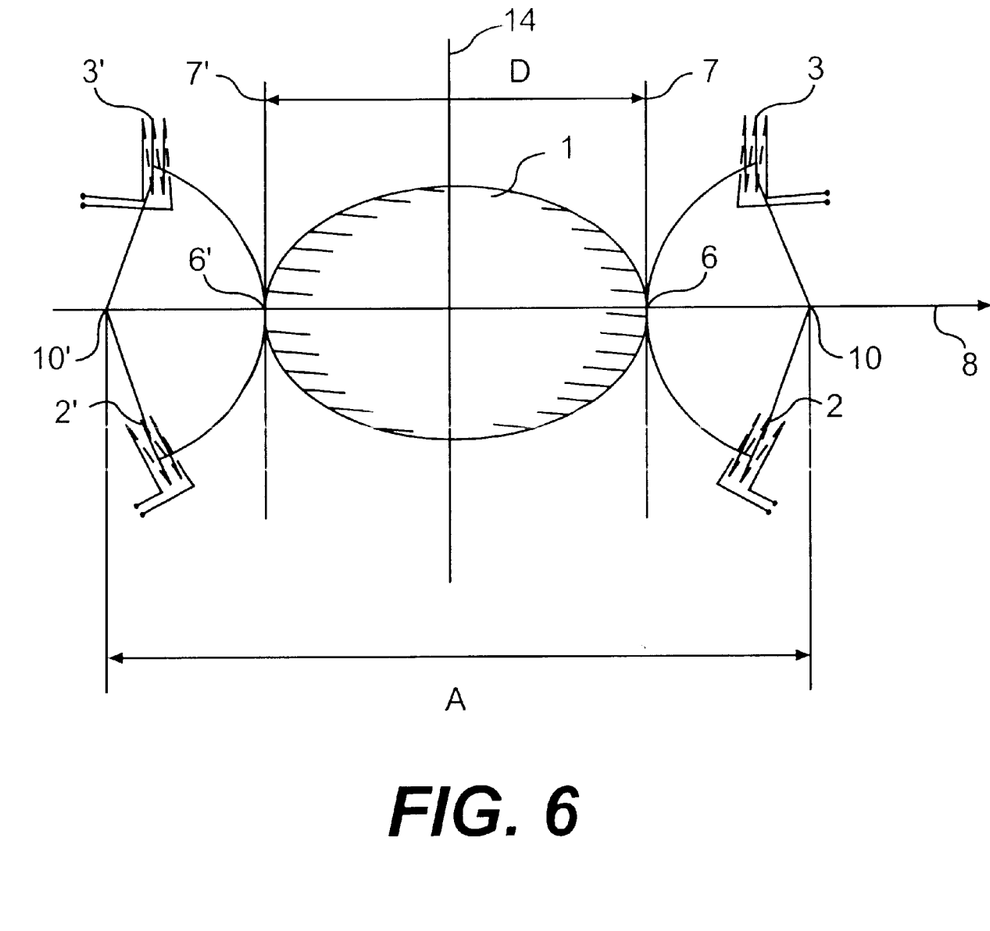
FIG. 6 shows an example of measurement of position and measures of a measuring object with two coil systems according to the invention.

FIG. 6 shows an example of how, by combination of two measurement devices with two pairs of associated transmitter and receiver coils according to the invention, it is possible to determine two measures of the measuring objects, the position of the measuring object, and the length D of the symmetry line 8 of the measuring object in the direction of the x axis. FIG. 6 is obtained by a reflection of FIG. 2 on a line 14 parallel to the tangential plane 7. All the reflected features of FIG. 2 are provided with '; for example, 3' is the reflected receiver coil. By two measurements according to the invention, the distances M1 and M2 from two reference points, for example the centers 10 and 10' of the arc, to the measuring points 6 and 6' of the measuring region are obtained. The length D can then be calculated from the distance A between the centers of the arcs and the distances M1 and M2 between the mid-points as follows

D=A−(M1+M2).

The difference M1−M2 provides information about the placement of the measuring object on the line between the centers of the arcs.

Figure 7:
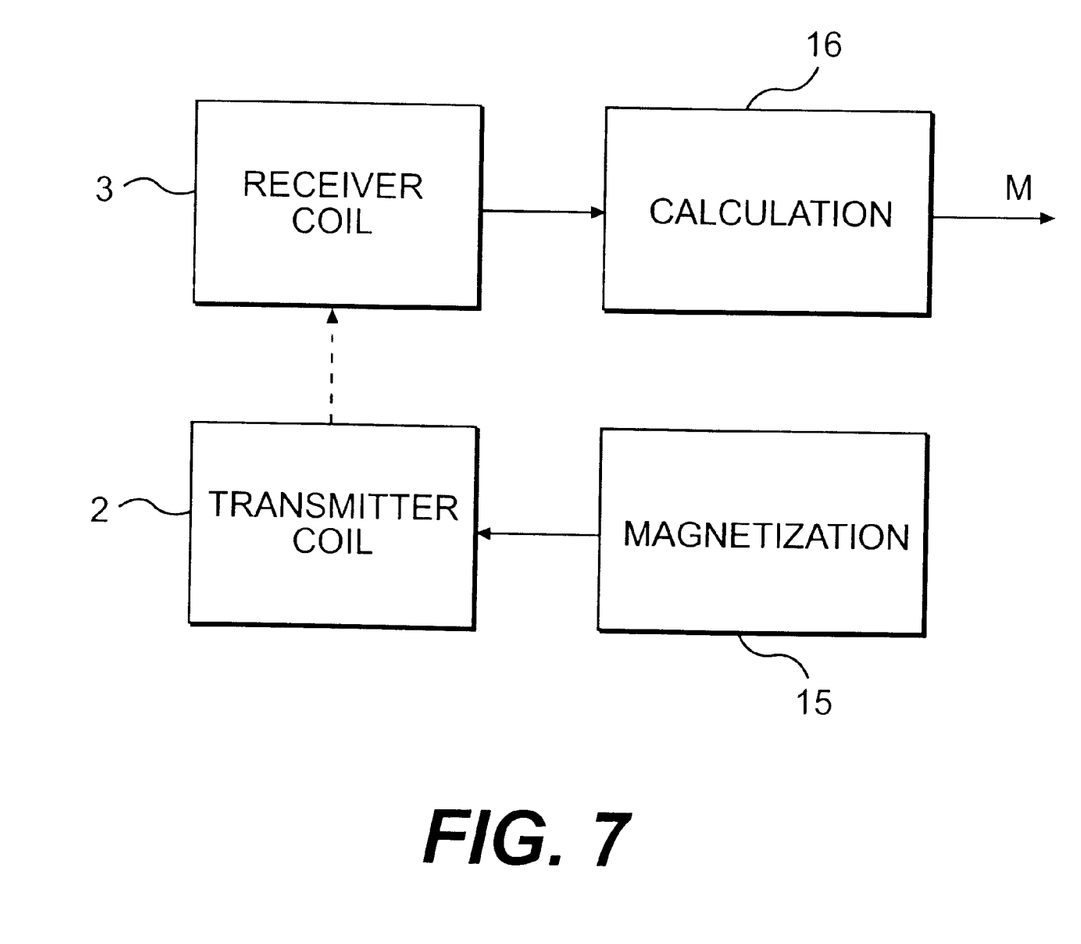
FIG. 7 shows, the units included in a device according to the invention.

A measurement operation by means of a device according to the invention, which comprises generation of the supply current to the transmitter coils, measurement and evaluation of the voltage induced across the receiver coils, is carried out with conventional methods which may be analog, digital, or a combination of digital and analog techniques. For example, the generation of the supply current and the integration of the induced voltages are carried out by means of analog electronics whereas the evaluation of the integrated signals with respect to the measures and position of the measuring object is performed with the aid of a digital technique in a micro-processor. Thus, for a device according to the invention to function, there are required, in principle, in addition to transmitter and receiver coils, a magnetization unit 15 for magnetization of the transmitter coil and a calculating unit 16 as shown in FIG. 7.

What is claimed is:

1. A method of non-contact measurement using electromagnetic induction, comprising:

arranging a measuring object having a measuring point on its outer surface and a measuring region on the measuring object around the measurement point;

generating a magnetic field with at least one transmitter coil, the magnetic field having field lines extending substantially parallel to the measuring region and touching the measuring point;

arranging at least one receiver coil to be traversed by the field lines parallel to the measuring region after these field lines pass through the measuring region;

detecting a voltage induced by said field lines in the at least one receiver coil; and determining characteristics including height, width and a position relative to a given reference point of the measuring object based on the voltage, said voltage being proportional to a distance of said measuring region from said reference point.

2. A method according to claim 1 wherein the magnetic field is made time-varying by supplying a constant current in the transmitter coil for such a duration that the magnetic field can be regarded as quasi-stationary and then interrupting the current.

3. A method according to claim 1 wherein the voltage which is induced in the receiver coil includes a first voltage pulse S1 for a time t1−t2 and a slowly decreasing second voltage pulse S2 starting at time t2 and wherein the determining step includes determining a position of the measuring object on a symmetry line perpendicular to a tangential plane at the measuring point in the measuring region of the measuring object according to $$M = a \cdot \int_{t1}^{t2} S1 \cdot dt + b \cdot \int_{t2}^{t3} S2 \cdot dt$$

where time t3 is selected so that the time t3−t2 is of the same order of magnitude as the time t2−t1 and where the coefficients a and b are selected after calibration with measuring objects made of materials of different electrical conductivity so that the difference in M between the materials becomes as small as possible.

4. An apparatus for non-contact measurement of a measuring object, the measuring object having a measuring point on its outer surface, the apparatus comprising:

at least one transmitter coil generating a time-varying magnetic field with field lines, the at least one transmitter coil being arranged such that the field lines are substantially parallel to a plane tangential to the measuring point; and at least one receiver coil arranged to be traversed by the field lines parallel to the plane after these field lines pass the measuring point, whereby characteristics of the measuring object including height, width and distance from a given reference point may be determined based on a voltage induced by said field lines in said receiver coil.

5. The apparatus according to claim 4, wherein the at least one transmitter coil and the at least one receiver coil (3) are arranged substantially symmetrically on opposite sides of a symmetry line extending perpendicularly from the tangential plane at the measuring point, and the transmitter coil, the measuring point and the receiver coil are arranged substantially on one circular arc, turned outwardly from the measuring point, with a center of the circular arc on the symmetry line.

6. The apparatus according to claim 4, further comprising an integrated magnetization unit which delivers a constant current in the transmitter coil, with such a duration that the magnetic field may be regarded as quasi-stationary, and whereby the time-varying magnetic field arises when the constant current is interrupted.

7. The apparatus according to claim 6, further comprising an integrated calculating unit which receives the voltage induced in the receiver coil an input signal, the current in the transmitter coil being interrupted at time t1, the voltage including a first voltage pulse S1 for a time t1–t2 and a slowly decreasing second voltage pulse S2 starting at time t2, and wherein the calculating unit is adapted to calculate a measure M of the position of the measuring object on a symmetry line perpendicular to the tangential plane at the measuring point of the measuring object according to $$M = a \cdot \int_{t1}^{t2} S1 \cdot dt + b \cdot \int_{t2}^{t3} S2 \cdot dt$$

where time t3 is preferably selected so that the time t3–t2 is of the same order of magnitude as the time t2–t1 and where the coefficients a and b are selected after calibration with measuring objects made of materials of different electrical conductivity so that the difference in M between the materials becomes as small as possible.

8. The apparatus according to claim 5, comprising two receiver coils with a common mid-point on the circular arc and with center lines perpendicular to each other and wherein the center line of one coil is directed towards the measuring point of the measuring object.

9. The apparatus according to claim 5, comprising two receiver coils with mid-points on different sides of the circular arc and with substantially parallel center lines which are parallel to the symmetry line.

10. The apparatus according to claim 4, comprising two pairs of associated receiver and transmitter coils, a first pair of said two pairs arranged with respect to a first point on said measuring object, and a second pair of said two pairs arranged with respect to a second point on said measuring object, said first and second points being substantially aligned along a common symmetry line.

* * * * *